United States Patent [19]
Parkinson

[11] 3,796,093
[45] Mar. 12, 1974

[54] PHASE DISPLACEMENT MEASURING APPARATUS FOR MEASURING A CHARACTERISTIC OF A SYSTEM WHEN THE SYSTEM IS AT STANDSTILL

[76] Inventor: James R. Parkinson, R.D. No. 3, Vergennes, Vt. 05491

[22] Filed: June 26, 1972
(Under Rule 47)

[21] Appl. No.: 266,479

[52] U.S. Cl. ............................................. 73/136 A
[51] Int. Cl. ............................................. G01l 3/10
[58] Field of Search.... 73/136 A; 324/34 D, 34 GT, 324/161, 166, 167, 173, 174

[56] References Cited
UNITED STATES PATENTS
3,079,791  3/1963  Oswald ............................ 73/136 A
3,538,762  11/1970  Parkinson et al. ................ 73/136 A
3,548,649  12/1970  Parkinson ........................ 73/136 A FOREIGN PATENTS OR APPLICATIONS
644,234  10/1950  Great Britain .................... 73/136 A Primary Examiner—Charles A. Ruehl
Attorney, Agent, or Firm—Edwin E. Greigg

[57] ABSTRACT

A phase displacement measuring apparatus for measuring a torque characteristic of a system capable of making measurements at all speeds (including when the system is at standstill), the apparatus deriving the signals having a phase relationship related to the torque characteristic from the relative movement between the system and a movable sensing means.

11 Claims, 11 Drawing Figures

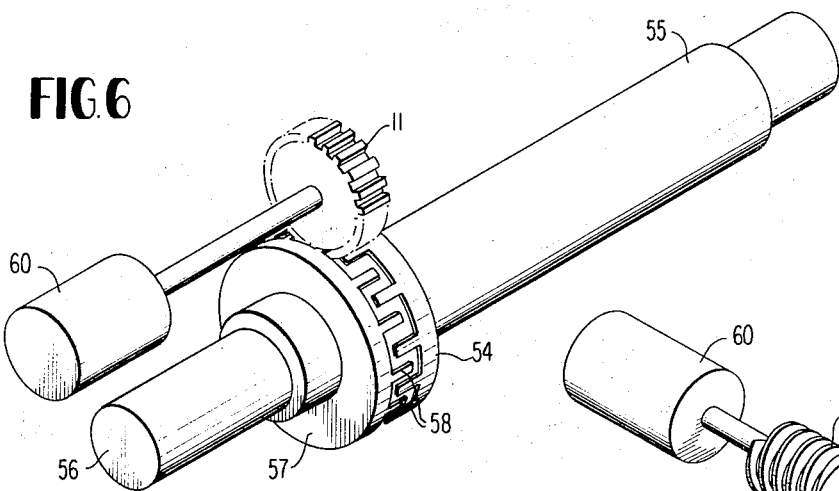
FIG.6
FIG.7
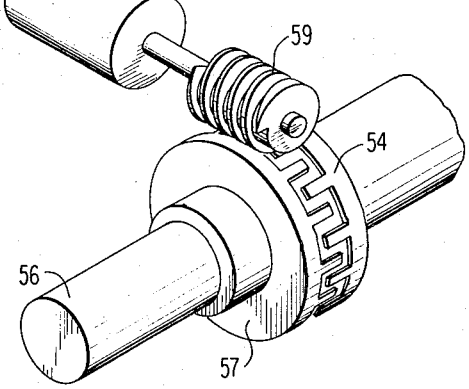
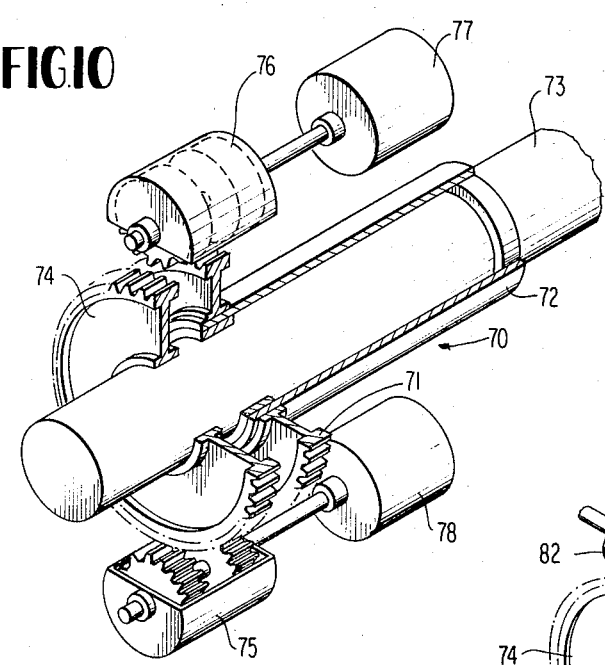
FIG.10
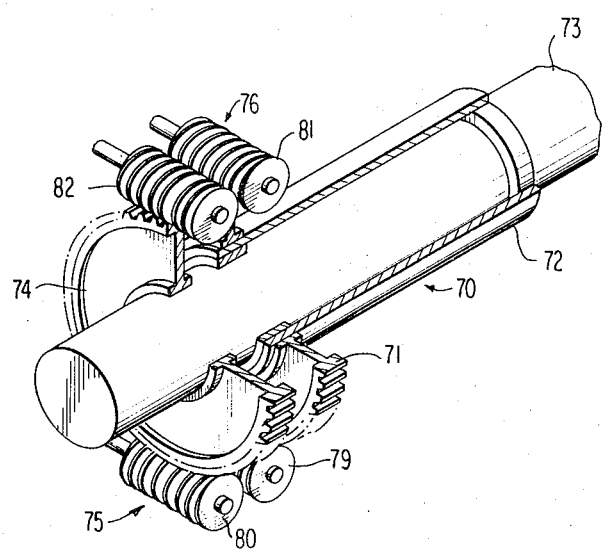
FIG.11

PHASE DISPLACEMENT MEASURING APPARATUS FOR MEASURING A CHARACTERISTIC OF A SYSTEM WHEN THE SYSTEM IS AT STANDSTILL

BACKGROUND OF THE INVENTION

This invention relates to a phase displacement measuring apparatus for measuring a characteristic of a system, and more particularly to such a measuring apparatus capable of making measurements at all speeds (including when the system is at standstill).

Generally, a phase displacement measuring apparatus derives a pair of sine waves from the movement of the system upon which the measurement is being made by disrupting a flux path between a magnetic sensing means and the system to generate the sine waves. It is also known to use a photocell system in which a light beam is disrupted by the movement of the system. With the magnetic approach a pair of toothed wheels is fixed to the system and coupled to a magnetic sensing means; with an optical system, slotted discs are fixed to the system. The measured characteristic is related to the relative position of the wheels or discs with respect to each other, and can be torque, position, or any other characteristic of a system which can be represented by a relative position difference between components of the system.

When torque is the characteristic being measured and the system upon which the measurement is being made includes a shaft, it is known to derive from the twist of the shaft, a reference signal and a torque responsive signal where the relative phase difference between the two signals is related to the torque on the shaft.

More particularly, a reference means, which can include a reference toothed wheel fixed to a sleeve, is fixed to the shaft upon which the torque measurement is to be made. A torque responsive means, which includes a torque responsive toothed wheel fixed directly to the shaft, spaced from the point at which the reference means sleeve is attached, is angularly displaceable relative to the reference means in response to the torque on the shaft. To derive a torque indicating signal from the relative position of the two toothed wheels, a magnetic sensing means is magnetically coupled to the reference toothed wheel, and a second magnetic sensing means is magnetically coupled to the torque responsive toothed wheel. As the shaft rotates and the teeth of the two wheels pass adjacent to their respective magnetic sensing means transducers, the flux path between the magnetic sensing means and the wheels is distributed and detectable electrical sine waves are generated by the sensig means. Since the relative position of the torque responsive toothed wheel with respect to the reference toothed wheel is indicative of the twist of the shaft, the sine waves will be displaced from each other by a phase difference related to the position of the two wheels and hence to the torque on the shaft.

Various modifications have been made on this basic approach to provide compensation for shaft misalignment as in U.S. Pat. No. 3,538,762 and to employ one sensing means instead of two as shown in U.S. Pat. No. 3,548,649. The aforementioned patents are owned by the same assignee as in the present application.

One major disadvantage of known torque measuring apparatus of this type in particular is that relative movement between the system and the sensing means is required to generate usable sine waves. Presently used systems are ineffective when the system is at standstill. Thus, known torque measuring systems are incapable of making measurements at low speeds or when the shaft is at a standstill, that is, when the shaft is at zero speed.

The present invention described in this specification is capable of torque measurement at any speed by providing a movable sensing means coupled to a reference means and to a torque responsive means that are fixed to the shaft upon which the torque measurement is to be made, thereby being capable of creating sufficient relative motion to generate usable signals. When the shaft is moving slowly or is at standstill and there is not sufficient relative movement between the shaft and the sensing means to generate the sine waves, a drive means is engaged which is coupled to the movable sensing means and imparts motion to the sensing means relative to the reference means and to the torque responsive means. After the shaft is rotating at a speed sufficient to generate the signals with the sensing means at a standstill, the drive means is stopped and the movable sensing means is also stopped. It should be apparent that in normal usage the shaft will be rotating at sufficient speed most of the time and that engagement of the drive means for the sensors is only required during start up, stall or reversing conditions. Also, the sensor drive means circuit should automatically sense a drop in signal strength below some threshold level as a signal to engage the drive.

The movable sensing means of this invention is shown in conjunction with a number of phase displacement torque measuring apparatus such as the "two wheel-one transducer" apparatus of U.S. Pat. No. 3,548,649, a "two wheel-two transducer" apparatus, and a "three wheel-three transducer" apparatus of U.S. Pat. No. 3,538,762.

It should be noted that this invention is not limited to these embodiments in which magnetic coupling is employed between a sensing means and toothed wheels fixed to the shaft. Optical coupling between an optical sensor and slotted discs fixed to the shaft or any other suitable coupling could be used. Further, other characteristics of rotating shafts may be measured by appropriately applying this concept.

OBJECTS OF THE INVENTION

It is accordingly an object of this invention to provide a phase displacement measuring apparatus for measuring a characteristic of a system whether the system is moving or not.

It is another object of this invention to provide a phase displacement torque measuring apparatus for measuring the torque on a shaft at all shaft speeds, including zero shaft speed.

It is a further object of this invention to provide a phase displacement torque measurement system in which the sensing means is moved with respect to the toothed reference wheel and torque responsive wheel, thereby creating a relative motion fast enough to create a usable signal in the sensing means at low shaft speeds.

Another object of this invention is to provide a phase displacement torque measurement system in which the sensing means is moved with respect to the toothed reference wheel and torque responsive wheel only when the shaft speed is below a threshold level at which a usable signal from the sensing means would not otherwise be created.

Still another object of this invention is to provide a phase displacement torque measurement system in which the movable sensing means are toothed wheels mounted on a single driven shaft, each magnetically coupled to a flux responsive sensor coil.

Still a further object of this invention is to provide a phase displacement torque measurement system in which the movable sensing means are worm wheels mounted on separate shafts and driven in phase by a timing belt, each worm wheel magnetically coupled to a flux responsive sensor coil.

The invention will be better understood as well as further objects and advantages will become more apparent from the ensuing detailed specification of several exemplary embodiments taken in conjunction with the drawing.

DESCRIPTION OF THE DRAWINGS

FIG. 6 shows a "one transducer-two wheel" torque measuring apparatus with the movable sensing means of FIG. 1 according to this invention;

FIG. 7 shows a "one transducer-two wheel" torque measuring apparatus with the movable sensing means of FIG. 3 according to this invention;

FIG. 10 shows a "four transducer-two wheel" torque measuring apparatus with the movable sensing means of FIG. 1 according to this invention; and FIG. 11 shows a "four transducer-two wheel" torque measuring apparatus with the movable sensing means of FIG. 3 according to this invention.

DESCRIPTION OF THE PREFERRED EMBODIMENTS

Figure 1:
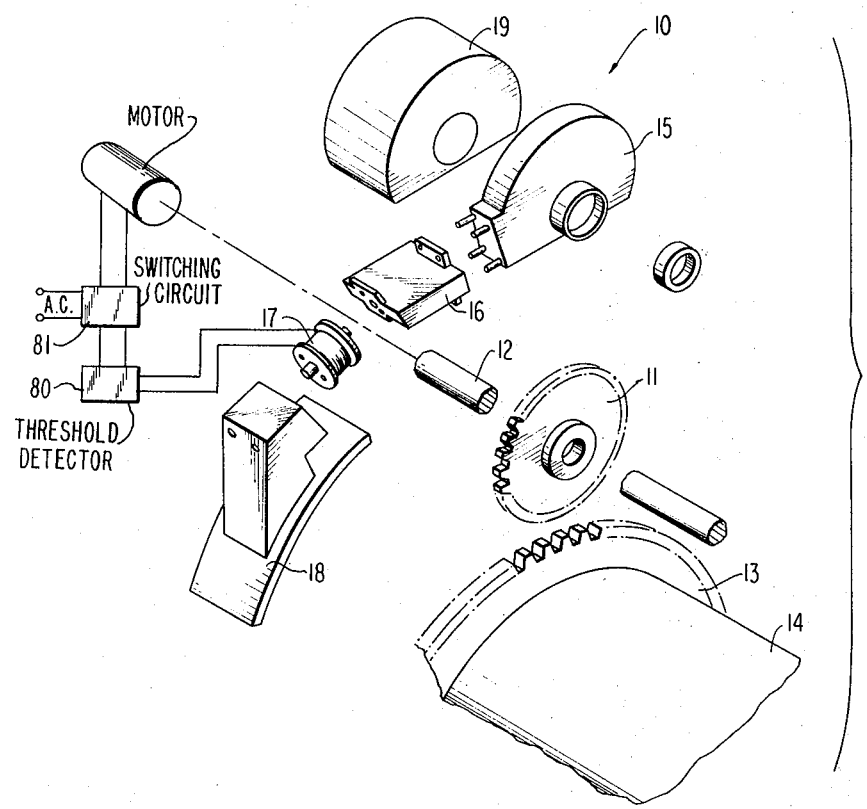
FIG. 1 shows in an exploded view one form of the movable sensing means employed in this invention.

Referring to FIG. 1, the movable sensing means 10 in one illustrative embodiment including a ferromagnetic toothed wheel 11 fixed to a non-magnetic shaft 12. The toothed wheel 11 of the magnetic sensing means 10 is located in proximity to and coupled to a ferromagnetic toothed wheel 13 which is fixed to the shaft 14 upon which the torque measurement is to be made. The toothed wheel 11 is housed in a ferromagnetic housing 15 which provides magnetic coupling between the toothed wheel 11 and a permanent magnet 16 which establishes the magnetic flux in the sensing system. In order to derive a signal from the relative movement between the toothed wheel 11 and the toothed wheel 13, an iron pole piece and sensor coil assembly 17 is connected to the permanent magnet 16, said sensor coil having induced in it a voltage, upon a change in the magnetic flux. A ferromagnetic shoe 18 upon which the pole and sensor coil assembly 17 are mounted, provides an effective magnetic return path to the toothed wheel 13. By means of this arrangement, a magnetic circuit is established through the toothed wheel 13, the toothed wheel 11, the housing 15, permanent magnet 16, coil assembly 17, shoe 18, and back to the toothed wheel 13. When a number of adjacent sensing units are used, a non-magnetic separator 19 is fixed to the ferromagnetic housing 15.

When there is relative movement between the toothed wheel 13 on the shaft 14 upon which the torque measurement is to be made and the toothed wheel 11 of the movable sensing means 10, the changing air gap causes a flux change in the magnetic path, this flux change inducing a voltage in the coil assembly 17 which can be used to derive a sine wave at all shaft speeds as will be subsequently explained.

It should be obvious that the linear speed of the teeth on the toothed shaft wheel 13 and the toothed sensor wheel 11 must be substantially different in order to create a usable flux change.

By way of example, the following description refers to the signals generated between the torque responsive toothed wheel and its sensor wheel, but it should be understood that the same changes occur between the reference toothed wheel and its sensor wheel.

The output signal from the sensor coil assembly 17 is coupled to an amplitude threshold detector 80 which produces a control signal whenever the output falls below a minimum level. The control signal from the detector 80 is coupled to a switching circuit 81 and effects the energization of a drive motor 82 which drives the shaft 12.

Figure 2:
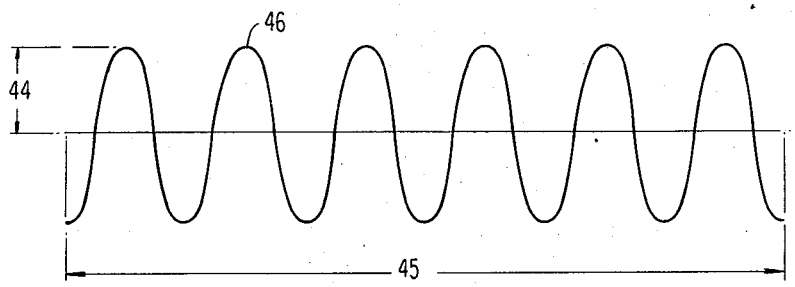
FIG. 2 shows a series of graphs which describe the action of the present invention.
Figure 2:
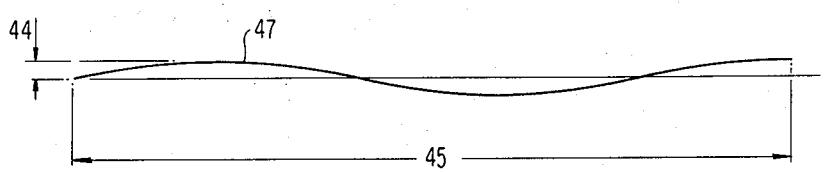
Figure 2:
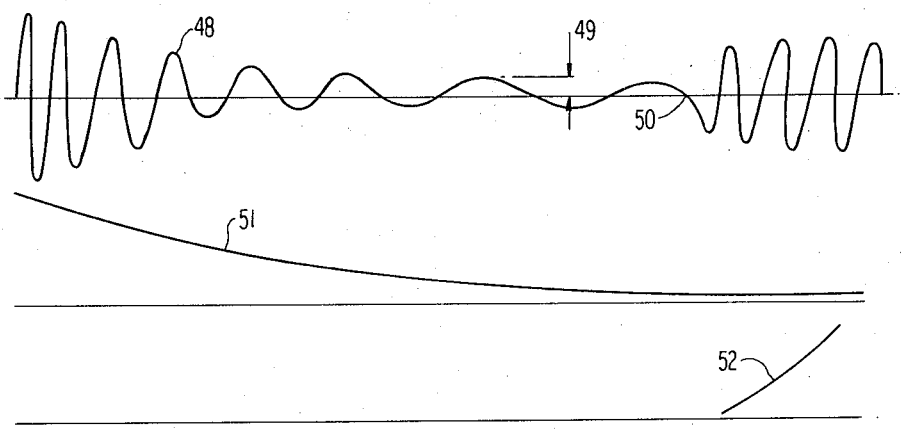

Referring to FIG. 2, there is shown a sine wave 46 induced in the sensing coil 17 in which the ordinate is voltage and is a result of the rate of change of the flux passing through the toothed torque responsive wheel 13 and the toothed sensor wheel 11, and with the sensor wheel not rotating, the abscissa is time, the frequency being equal to the number of teeth of the torque responsive wheel passing a single point on the sensing wheel in a second and is illustrated in curve 46. When the shaft slows towards zero, the ordinate which is voltage induced in the sensing coil of the sensor is very small as illustrated by curve 47 and hardly usable, since it drops down into the noise level, the frequency being also very low and as mentioned before, a function of the number of teeth on the toothed torque responsive wheel 13 passing a single point on the sensing wheel 11 with the sensor wheel not rotating. When this happens, the signal induced in the sensing coil 17 is no longer usable, therefore the sensing wheel 11 has to be rotated to produce a higher relative velocity between itself and the toothed torque responsive wheel. The minimum threshold level at which the sensing wheel 11 rotation is required, can be somewhat arbitrarily chosen between that point where the voltage induced in the sensing coil is high enough to be able to obtain reliable phase information with the circuitry that is to be used and low enough so that the sensor wheel is at a standstill most of the time, i.e., during normal operation. This point, the minimum threshold level, can be sensed either by a given minimum voltage level in which case the drive for the sensor wheel would be energized and remain on until the voltage level exceeded a maximum threshold level which would denote a high shaft speed or it can be sensed by a measurement directly of shaft speed by a second stationary sensor which circuitry would energize the drive means when the counts per second fall below the minimum shaft speed required. It is believed to be apparent to those skilled in the art that the voltage induced in the sensing coil 17 and relative peripheral passing speeds of the toothed torque responsive wheel 13 and the sensing wheel 11 are related by the characteristic of the coil itself as well as the magnetic circuit so that both methods of sensing the minimum threshold level are related.

The rotational speed of the sensor wheel 11 is unimportant except for the fact that it be fast enough to induce a usable signal since only phase information is necessary to determine the torque characteristics.

Curve 48 in FIG. 2 illustrates the change as the sensor wheel drive is energized. The left hand portion of the curve 48 illustrates the voltage induced with the shaft rotating at speeds high enough to induce usable voltages in the sensor coil 17, but gradually slowing down. As the shaft speed slows and the voltage reaches the minimum threshold level 49, the drive motor of the sensing wheel is energized at point 50 increasing the relative speed and therefore the voltage level and passing frequency, thus creating usable signals, even though the shaft speed is approaching zero. Curve 51 of FIG. 2 illustrates the shaft speed associated with curve 48 and curve 52 illustrates the sensor wheel speed associated with curve 48, the ordinate of both curves being revolutions per unit of time, and abscissa being in time corresponding to curve 48.

It should be apparent that the same discussion will apply to the following embodiment of this invention.

Figure 3:
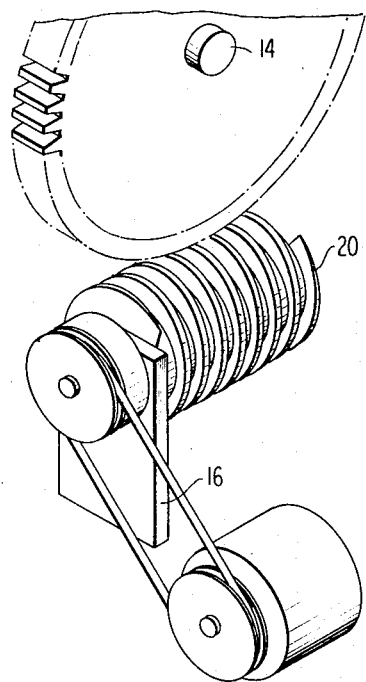
FIG. 3 shows another form of the movable sensing means employed in this invention.

Another form of the movable sensing means is shown in FIG. 3, in which a worm gear is used instead of a toothed wheel. The movable sensing means includes a worm gear 20 which is located in close proximity to and with its axis in the plane of the toothed wheel 13 that is fixed to the shaft 14 upon which the torque measurement is to be made. A permanent magnet 16' which establishes the magnetic flux in the system is situated under the worm gear 20 as viewed in the drawing. While a pole piece and coil assembly 17 and shoe 18, as shown in FIG. 1, are not shown in FIG. 2, it should be realized that a return path and sensor coil must be used and a magnetic path between the worm gear 20 and the toothed wheel 13 completes the magnetic circuit. As worm gear 20 is driven, its teeth move axially, thereby traversing the teeth of the toothed wheel 13 in the same manner as did the teeth of toothed wheel 11 shown in FIG. 1.

In a like manner to FIG. 1, when there is relative movement between the teeth of worm gear 20 and those of the toothed wheel 13, the changing air gap causes a flux change in the magnetic path, this flux change thus inducing a voltage in a coil (not shown) in a manner similar to that in FIG. 1.

In the remaining figures the movable sensing means of FIG. 1 and FIG. 3 is shown in conjunction with various phase displacement torque measurement apparatus according to this invention.

Figure 4:
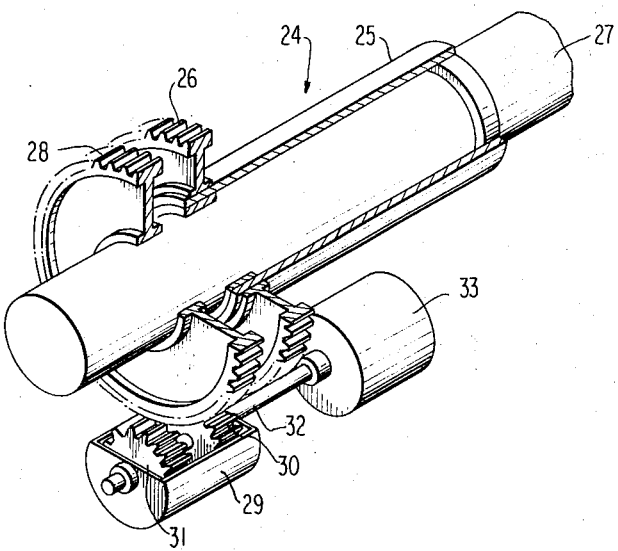
FIG. 4 shows a "two transducer-two wheel" torque measuring apparatus with the movable sensing means of FIG. 1 according to this invention.

Referring now to FIG. 4, there is shown reference means 24, which includes a sleeve 25 and a reference toothed wheel 26 fixed to the sleeve 25 which is, in turn, fixed to a shaft 27 upon which the torque measurement is to be made. A torque responsive toothed wheel 28, which is displaced relative to the reference toothed wheel 26 by the torque on the shaft 27, is fixed to the shaft 27 and is spaced from the reference toothed wheel 26.

In order that two signals having a phase difference related to the torque on the shaft 27 can be generated at all shaft speeds including zero shaft speed, a movable sensing means 29 is provided. The movable sensing means 29 includes a first ferromagnetic toothed wheel 30 located in proximity to and magnetically coupled to the reference toothed wheel 26, and a second ferromagnetic toothed wheel 31 located in proximity to and magnetically coupled to the torque responsive toothed wheel 28, the first toothed wheel 30 and the second toothed wheel 31 being axially aligned on a nonmagnetic shaft 32 which is connected to suitably drive means 33 so they may be driven together at the same speed in phase with each other. One unit of the movable sensing means is shown in greater detail in FIG. 1.

As was previously explained, the torque on shaft 27 causes it to twist and to thereby create a relative displacement between the reference toothed wheel 26 and the torque responsive toothed wheel 28 which causes a related phase shift between a pair of sine waves derived from the movement between the toothed wheels 26 and 28 and the toothed wheels 30 and 31 of the movable sensing means 29. If the shaft 27 is rotating at sufficient speed, there is relative movement between the shaft and the sensing means 29 and usable signals are generated even if the movable sensing means 29 is at standstill. When the shaft 27 slows enough to cause the induced signals to be below a usable threshold level or shaft 27 is at standstill and a torque measurement is to be made, the movable sensing means 29 starts and is driven by the drive means 33 so that there is again relative movement between the two sets of toothed wheels 26 and 28 and 30 and 31 and usable signals can be generated.

Figure 5:
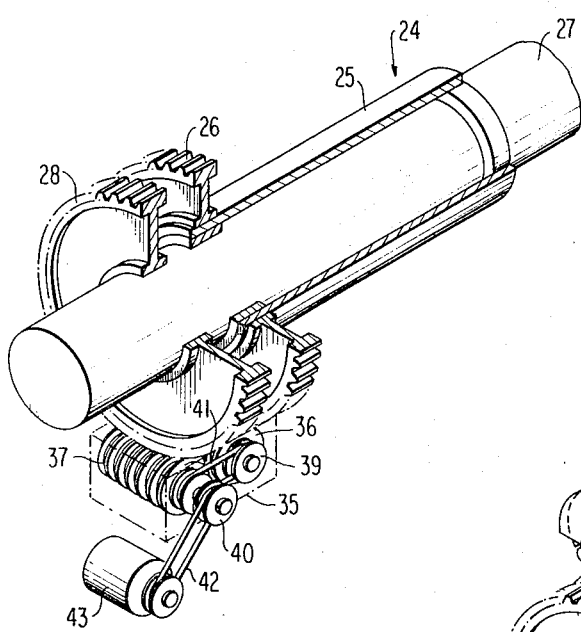
FIG. 5 shows a "two transducer-two wheel" torque measuring apparatus with the movable sensing means of FIG. 3 according to this invention.

FIG. 5 shows the "two-wheel-two transducer" apparatus of FIG. 4 using the form of the movable sensing means shown in FIG. 3. A reference means 24, which includes a reference toothed wheel 26 fixed to a sleeve 25 is fixed to a shaft 27 upon which the torque measurement is to be made. The torque responsive toothed wheel 28 which is displaced by the torque on the shaft 27 relative to the reference toothed wheel 26 is fixed directly to the shaft 27 and is spaced from the reference toothed wheel 26. To derive the sine waves whose phase difference is related to the torque on the shaft 27, a movable sensing means 35, which in this instance includes a first worm gear 36 located in proximity to and magnetically coupled to the reference toothed wheel 26, and a second worm gear 37 located in proximity to and magnetically coupled to the torque responsive toothed wheel 28, are provided.

To derive the sine wave signal when the shaft 27 is rotating slowly or is at zero speed, the worm gears 36 and 37 are coupled to a drive means which includes a pulley 39 fixed to the first worm gear 36, a pulley 40 fixed to the second worm gear 37, a belt 41 between the pulley 39 and the pulley 40, and a belt 42 connecting the pulley 40 to a motor 43.

When the shaft 27 is rotating slowly or not at all, the worm gears 36 and 37 are rotated and their teeth more relative to the toothed wheels 26 and 28 so that the torque indicating signals can be generated according to the invention. It is to be understood also that the movable sensing means 35 includes a coil, magnet, and return shoe for each worm gear as shown in greater detail in FIGS. 1 and 3.

It must be realized that the worm gears 36 and 37 must be driven at the same speed in order to detect slight phase differences and therefore timing belts and pulleys with very little if any backlash must be used. Also antibacklash gearing can be effectively substituted for the timing belts.

FIG. 6 shows a "one transducer-two wheel" phase displacement torque measuring apparatus of the type shown in U.S. Pat. No. 3,548,649, incorporating a movable sensing means according to this invention.

Accordingly, a reference means 53 includes a reference toothed wheel 54 fixed to a sleeve 55 which is fixed to the shaft 56 upon which the torque measurement is to be made. A torque responsive toothed wheel 57 is fixed to the shaft 56 and is displaceable relative to the reference toothed wheel 54 in response to the torque on the shaft 56, the teeth of the toothed wheels 54 and 57 being arranged parallel to the axis of the wheels and in an interlocking relationship as clearly shown so that a single toothed sensing wheel can be positioned over the interlocking protrusions 58. The movable sensing means, driven by drive means 60, is shown in greater detail in FIG. 1.

When there is relative movement between the movable sensing toothed wheel means 11 and the toothed wheels 54 and 57, only a single sine wave is generated in which any two adjacent cycles are relatively displaced as a function of the relative position of the toothed wheels 54 and 57 with respect to each other. The two adjacent cycles can be considered as a pair of signals that are related to each other by a phase difference that is a function of the torque on the shaft. The signal derived is clearly shown in my U.S. Pat. No. 3,548,649, issued Dec. 22, 1970, and it is believed to be apparent from the previous discussion how the movable sensing means operates and applies to this embodiment.

FIG. 7 shows the "one transducer-two wheel" apparatus of FIG. 5 in conjunction with the movable sensing means of FIG. 3. The movable sensing means, which is shown in greater detail in FIG. 3, includes a worm gear 59 located in proximity and magnetically coupled to the toothed wheels 54 and 57 and is driven by a drive means 60.

It should be apparent that the same operative principles apply as clearly described earlier.

Figure 8:
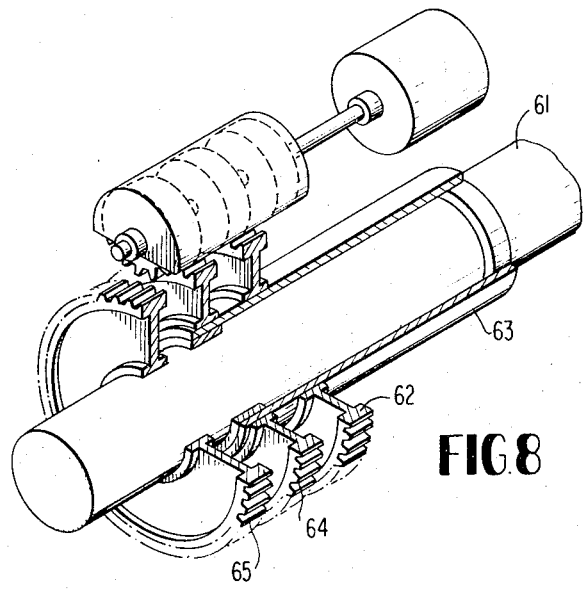
FIG. 8 shows a "three transducer-three wheel" torque measuring apparatus with the movable sensing means of FIG. 1 according to this invention.

FIG. 8 shows a "three-transducer-three wheel" phase displacement torque measuring apparatus which compensates for shaft misalignment that uses the movable sensing means of FIG. 1. The apparatus of FIG. 8 having a stationary sensing means is shown in U.S. Pat. No. 3,538,762, and this application represents an improvement in the art.

To compensate for the misalignment of the shaft 61 shown in FIG. 8, with respect to a sensing means as discussed in U.S. Pat. No. 3,538,762, a shaft position toothed wheel 62 is fixed to the sleeve 63 and spaced from the reference toothed wheel 64 on the opposite side from the torque responsive toothed wheel 65. The shaft position toothed wheel 62 acts to develop a sine wave that has a phase difference relative to the sine wave developed by the reference toothed wheel 64 that is related to the shaft misalignment. This phase difference is used to cancel any erroneous phase difference introduced by the shaft misalignment between the sine waves developed by the reference toothed wheel 64 and the torque responsive toothed wheel 65. The circuitry used is clearly described in the reference patents.

Figure 9:
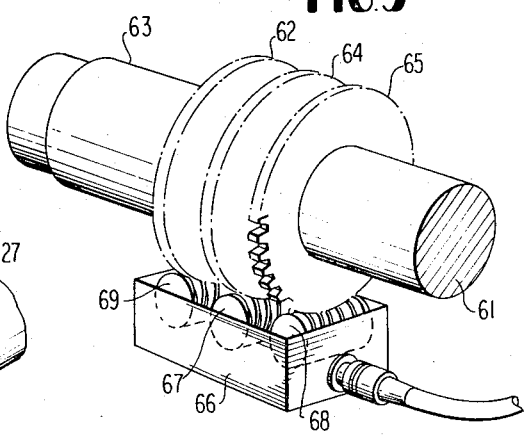
FIG. 9 shows a "three transducer-three wheel" torque measuring apparatus with the movable sensing means of FIG. 3 according to this invention.

FIG. 9 shows the "three transducer-three wheel" torque measuring apparatus of FIG. 8 with the movable sensing means of FIG. 3. It will be apparent to those skilled in the art how this invention relates to the embodiment shown.

A shaft position toothed wheel 62, reference toothed wheel 64 and torque responsive toothed wheel 65 are shown with the position toothed wheel 62 and the reference toothed wheel 64 fixed to a sleeve 63 which is fixed to a shaft 61 whose torque is to be measured, and the torque responsive toothed wheel 65 fixed directly to the shaft 61.

To derive the three sine waves, according to the invention, at all shaft speeds including zero shaft speed, a movable sensing means 66 is provided having a first worm gear 67 located in proximity to and magnetically coupled to the reference toothed wheel 64, a second worm gear 68 located in proximity to and coupled to the torque responsive toothed wheel 65, and a third worm gear 69 located in proximity to and coupled to the shaft position toothed wheel 62. The movable sensing means 66 is shown in greater detail in FIG. 3.

FIG. 10 shows another torque measuring apparatus which compensates for shaft misalignment by using only two wheels fixed to the shaft rather than three wheels as in FIG. 8.

A reference means 70 includes a reference toothed wheel 71 fixed to a sleeve 72 and is, in turn, fixed to a shaft. A torque responsive toothed wheel 74 is spaced from the reference toothed wheel 71 along the shaft 73.

To compensate for the misalignment of the shaft 73, two movable sensing means 75 and 76 are shown located diametrically opposite and in close proximity to and magnetically coupled to the torque responsive toothed wheel 74 and the reference toothed wheel 71. The two drive motors 77 and 78 must be in synchronism or may be replaced by one drive motor with appropriate gearing to achieve the same result.

When the shaft 73 is rotating slowly or at standstill, drive means 77 and 78 impart motion to the movable sensing means 75 and 76 so that two pairs of sine waves can be developed in which the phase shift introduced by shaft misalignment can be cancelled. The circuitry and misalignment cancelling action of this embodiment are clearly described in the reference patents and thus will not be described here. It is believed to be apparent to those skilled in the art how the movable sensing means is applied to this embodiment to measure torque at zero speed in view of the earlier description.

FIG. 11 shows the torque measuring apparatus of FIG. 10 with the movable sensing means of FIG. 3.

As in FIG. 10, a reference means 70, having a reference toothed wheel 71 fixed to a sleeve 72 is fixed to the shaft 73 upon which the torque measurement is to be made. A torque responsive toothed wheel 74 is fixed to the shaft 73. Instead of the toothed wheels in the movable sensing means as in FIG. 10, the movable sensing means 75 shown in FIG. 11 has a first worm gear 79 magnetically coupled to the reference toothed wheel 71, and a second worm gear 80 magnetically coupled to the torque responsive toothed wheel 74. A second movable sensing means 76 has a first worm gear 81 magnetically coupled to the reference toothed wheel 71, and a second worm gear 82 magnetically coupled to the torque responsive toothed wheel 74.

To generate the torque indicating signals when the shaft 73 is moving slowly, the movable sensing means 75 and 76 are driven in the manner described earlier herein.

It is believed that it will be apprent at this time to those skilled in the art that any appropriate circuitry could be coupled to the sensing means for deriving the torque on the shaft from the relative phase difference between the sine waves. One such circuit is shown in U.S. Pat. No. 3,538,762 to J.R. Parkinson et al.

While specific embodiments of this invention have been shown and described, other embodiments may be made without departing from the spirit and scope thereof.

What is claimed is:

1. A phase displacement measuring apparatus for measuring the torque on a shaft at all shaft speeds, including zero shaft speed comprising, in combination:
   a. reference means fixed to said shaft;
   b. a torque responsive means fixed to said shaft, spaced from said reference means and displaceable relative to said reference means by the torque on said shaft;
   c. selectively movable sensing means located in proximity to and coupled to said reference means and said torque responsive means, said sensing means producing a torque related output signal in response to relative displacement between and motion of said reference means and said torque responsive means;
   d. drive means coupled to said movable sensing means for imparting motion to said movable sensing means relative to said reference means and to said torque responsive means; and
   e. means for energizing said drive means when the magnitude of said output signal drops below a minimum threshold level;
   whereby torque on the shaft can be determined at all shaft speeds including zero shaft speed.

2. A phase displacement measuring apparatus for measuring the torque on a shaft at all shaft speeds, including zero shaft speed comprising, in combination:
   a. a sleeve fixed to said shaft;
   b. a reference toothed wheel fixed to said sleeve;
   c. a torque responsive toothed wheel fixed to said shaft, spaced from said reference toothed wheel and displaceable relative to said reference toothed wheel by the torque on said shaft;
   d. a selectively movable sensing means located in proximity to and coupled to said reference toothed wheel and to said torque responsive toothed wheel, said sensing means producing a torque related output signal in response to relative displacement between and motion of said reference toothed wheel and said torque responsive toothed wheel;
   e. drive means coupled to said movable sensing means for imparting motion to said movable sensing means relative to said reference toothed wheel and to said torque responsive toothed wheel; and
   f. means for energizing said drive means when the magnitude of said output signal drops below a threshold level;
   whereby torque on the shaft can be determined at all shaft speeds including zero shaft speed.

3. The phase displacement measuring apparatus as recited in claim 2, wherein the movable sensing means includes a toothed wheel located in proximity to and coupled to the reference toothed wheel and to the torque responsive toothed wheel.

4. The phase displacement measuring apparatus as recited in claim 2, wherein the movable sensing means includes a worm gear located in proximity to and coupled to the reference toothed wheel and to the torque responsive toothed wheel.

5. The phase displacement measuring apparatus as recited in claim 2, wherein the movable sensing means includes a first toothed wheel located in proximity to and coupled to the reference toothed wheel, and a second toothed wheel located in proximity to and coupled to the torque responsive toothed wheel.

6. The phase displacement measuring apparatus as recited in claim 2, wherein the movable sensing means includes a first worm gear located in proximity to and coupled to the reference toothed wheel, and a second worm gear located in proximity to and coupled to the torque responsive toothed wheel.

7. The phase displacement measuring apparatus as recited in claim 2, wherein a second movable sensing means is located in proximity to and coupled to the reference toothed wheel and to the torque responsive toothed wheel.

8. The phase displacement measuring apparatus as recited in claim 7, wherein the second movable sensing means includes a first toothed wheel located in proximity to and coupled to the reference toothed wheel, and a second toothed wheel located in proximity to and coupled to the torque responsive toothed wheel.

9. The phase displacement measuring apparatus as recited in claim 7, wherein the second movable sensing means includes a first worm gear located in proximity to and coupled to the reference toothed wheel, and a second worm gear located in proximity to and coupled to the torque responsive toothed wheel.

10. The phase displacement measuring apparatus as recited in claim 2, wherein a shaft position toothed wheel is fixed to the sleeve and spaced from the reference toothed wheel on the opposite side from the torque responsive toothed wheel and the movable sensing means includes a first toothed wheel located in proximity to and coupled to the reference toothed wheel, a second toothed wheel located in proximity to and coupled to the torque responsive toothed wheel, and a third toothed wheel located in proximity to and coupled to the shaft position toothed wheel.

11. The phase displacement measuring apparatus as recited in claim 2, wherein a shaft position toothed wheel is fixed to the sleeve and spaced from the reference toothed wheel on the opposite side from the torque responsive toothed wheel and the movable sensing means includes a first worm gear located in proximity to and coupled to the reference toothed wheel, a second worm gear located in proximity to and coupled to the torque responsive toothed wheel, and a third worm gear located in proximity to and coupled to the shaft position toothed wheel.

* * * * *